United States Patent
Dingsor et al.

(10) Patent No.: US 7,509,435 B2
(45) Date of Patent: Mar. 24, 2009

(54) NETWORK ADDRESS TRANSLATION AND PORT MAPPING

(75) Inventors: Andrew D. Dingsor, Durham, NC (US); Craig A. Lanzen, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1336 days.

(21) Appl. No.: 09/803,825

(22) Filed: Mar. 12, 2001

(65) Prior Publication Data

US 2002/0129165 A1 Sep. 12, 2002

(51) Int. Cl.
G06F 15/16 (2006.01)
(52) U.S. Cl. .................................................... 709/246
(58) Field of Classification Search ................ 709/246
See application file for complete search history.

(56) References Cited

U.S. PATENT DOCUMENTS

| | | | | | |
|---|---|---|---|---|---|
| 5,227,788 | A | * | 7/1993 | Vacon et al. | 340/825.52 |
| 5,287,103 | A | * | 2/1994 | Kasprzyk et al. | 340/825.52 |
| 5,371,852 | A | * | 12/1994 | Attanasio et al. | 709/245 |
| 5,793,763 | A | * | 8/1998 | Mayes et al. | 370/389 |
| 6,006,272 | A | * | 12/1999 | Aravamudan et al. | 709/245 |
| 6,055,236 | A | * | 4/2000 | Nessett et al. | 709/245 |
| 6,058,106 | A | * | 5/2000 | Cudak et al. | 709/243 |
| 6,157,955 | A | * | 12/2000 | Narad et al. | 709/228 |
| 6,353,614 | B1 | * | 3/2002 | Borella et al. | 709/238 |
| 6,381,638 | B1 | * | 4/2002 | Mahler et al. | 709/220 |
| 6,389,462 | B1 | * | 5/2002 | Cohen et al. | 709/218 |
| 6,434,627 | B1 | * | 8/2002 | Millet et al. | 709/245 |
| 6,601,101 | B1 | * | 7/2003 | Lee et al. | 709/227 |
| 6,650,641 | B1 | * | 11/2003 | Albert et al. | 709/245 |
| 6,687,732 | B1 | * | 2/2004 | Bector et al. | 709/200 |
| 6,822,957 | B1 | * | 11/2004 | Schuster et al. | 709/238 |
| 7,032,242 | B1 | * | 4/2006 | Grabelsky et al. | 709/225 |

OTHER PUBLICATIONS

Lee, Eun-Sang et al. "An Expanded NAT with Server Connection Ability." TENCON 99: Proceedings of the IEEE Region 10 Conference. vol. 2. Sep. 15-17, 1999.*

* cited by examiner

*Primary Examiner*—Jason D Cardone
*Assistant Examiner*—Jeffrey R Swearingen
(74) *Attorney, Agent, or Firm*—Saul Ewing LLP; Stephen Calogero

(57) ABSTRACT

A method of processing a client packet from a client in a NAT (Network Address Translation & Port Mapping) system including a NAT machine and a plurality of servers. The method includes preparing a response packet responsive to the client packet, performing, by one of the servers, a translation operation on the response packet to produce a translated response packet, and transmitting the translated response packet from the server to the client, thereby bypassing the NAT machine. All subsequent response packets in the current connection can be translated and transmitted from the server directly to the client.

21 Claims, 4 Drawing Sheets

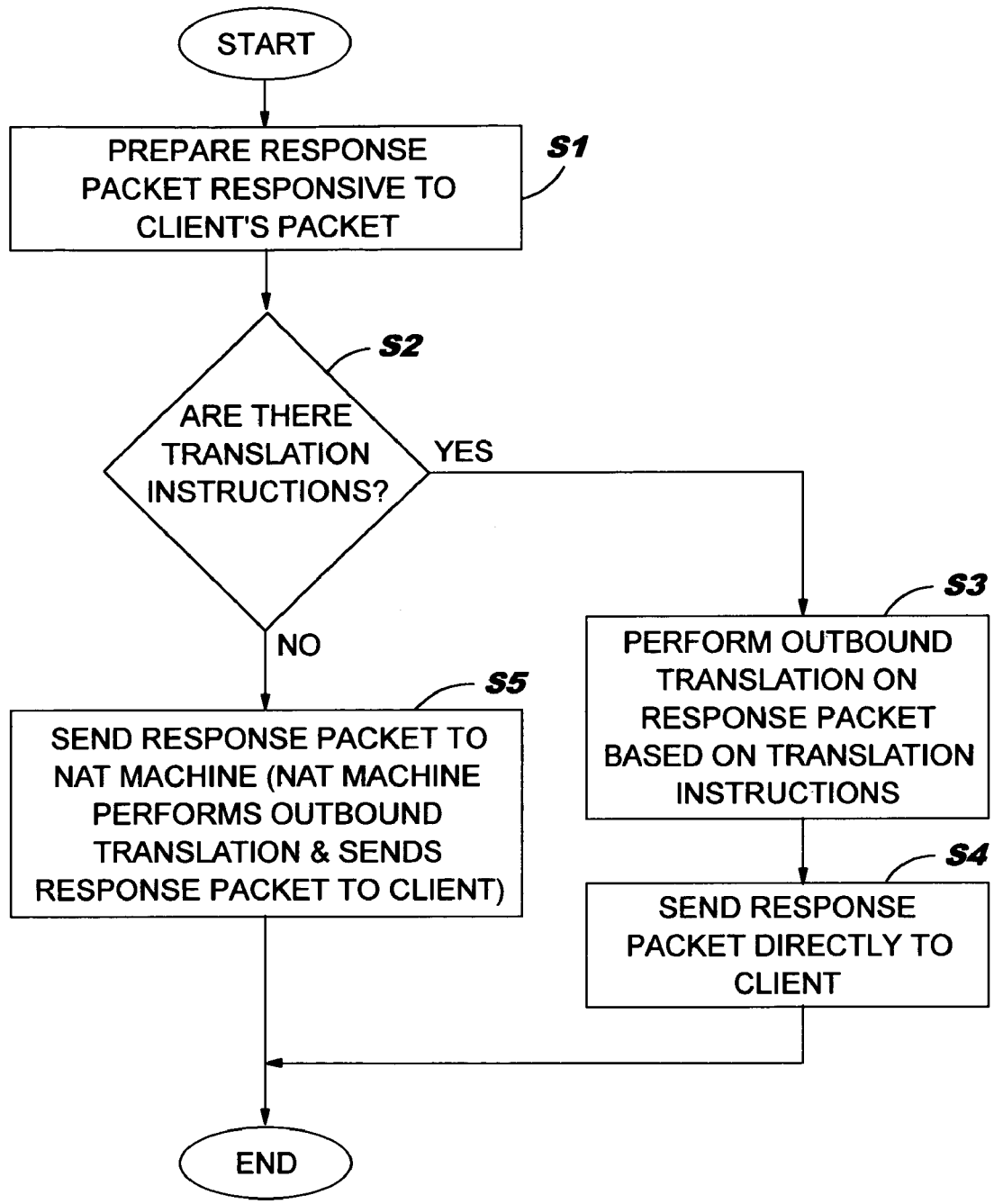

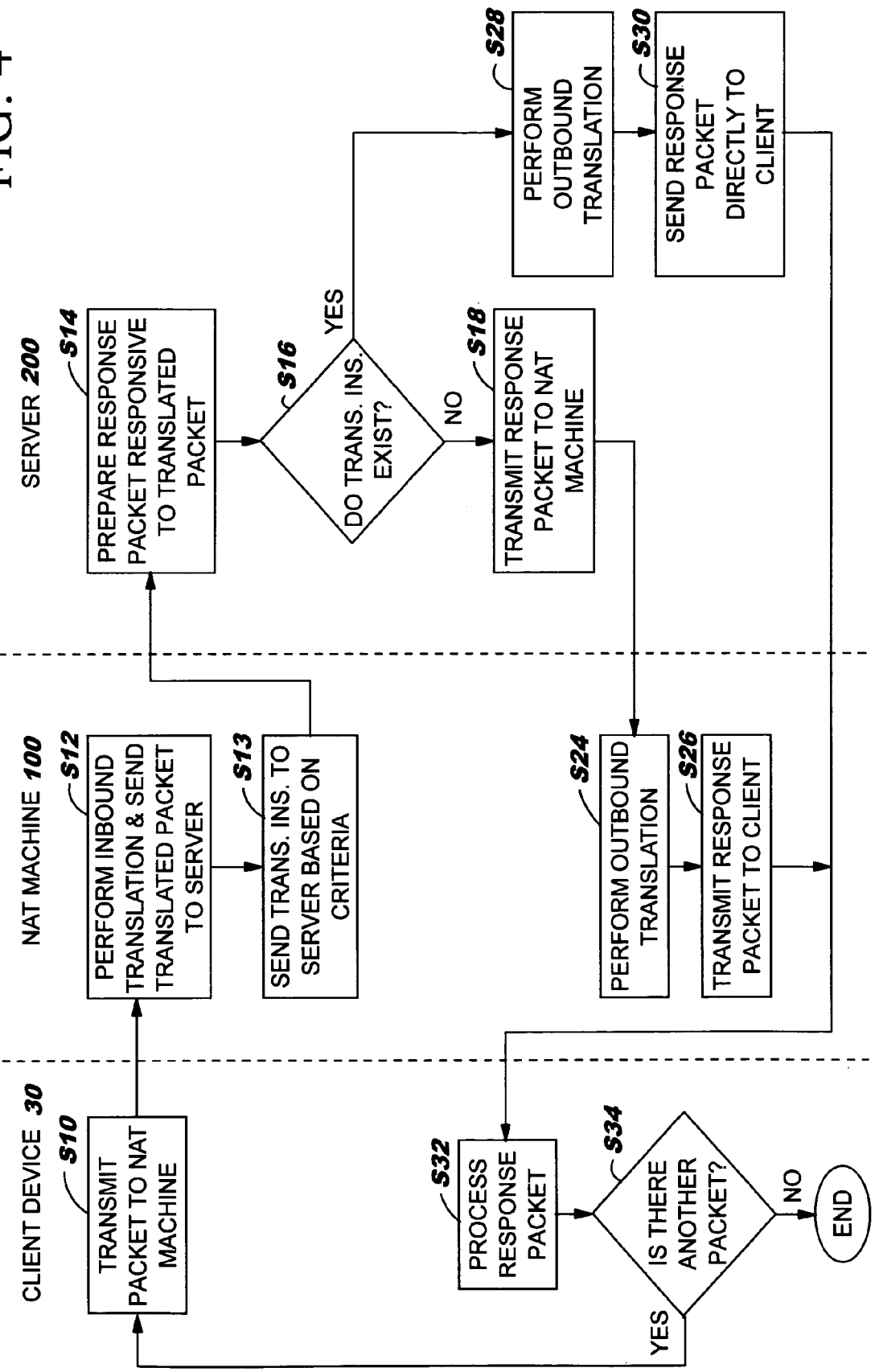

NETWORK ADDRESS TRANSLATION AND PORT MAPPING

BACKGROUND OF THE INVENTION

1. Field of the Invention

The present invention relates to load distribution systems and more particularly, to an improved NAT (Network Address Translation and Port Mapping) method and system for distributing data packets from clients in a website system.

2. Discussion of the Related Art

Network Address Translation and Port Mapping (also known as "NAT") is the translation of an Internet Protocol address (IP address) and port used within a first network, to a different IP address and port used within a second network. In a conventional NAT system, a single NAT machine and a plurality of identical servers are provided as part of a website system of a website provider. Since the servers are identical, each server is capable of processing data packets from different client devices or PCs and thus, client load can be distributed among these servers. A data packet from a client device (hereinafter "client packets") can contain a request for a TCP/IP connection for establishing a communications path between the client device and the website system, a request for a particular website or page from the website system, or any other data or request prepared by the client device.

FIG. 1 shows a block diagram of such a conventional NAT system. As shown in FIG. 1, a single NAT machine 10 functions as a gateway to a plurality of identical servers 20 in a website system. The NAT machine 10 includes an inbound translation module 12 and an outbound translation module 14. Each of the servers 20 includes application program(s) 22.

When a particular client wishes to access a site provided by the website system, the client operates a client device 30 which transmits a client packet to the NAT machine 10 via the Internet (not shown for the sake of brevity). This client packet may contain a request for a TCP/IP connection or a request for a page if the connection has been already established. The inbound translation module 12 receives the client packet and performs an inbound translation on the received packet. The inbound translation involves determining which of the servers 20 will receive the client packet based on predetermined criteria and modifying the header of the client packet to identify the current sender and receiver of the packet.

The server 20 receives the translated client packet from the NAT machine 10, and the application program 22 of the server 20 processes the client packet by preparing a response packet. The response packet may contain an acknowledgment of the client packet, requested page files, or other data. The server 20 sends the response packet to the outbound translation module 14 of the NAT machine 10, which in turn performs an outbound translation on the response packet by modifying the header of the response packet to identify the current sender and receiver of the packet. Once the response packet is translated, it is transmitted to the requesting client device 30 which processes the received packet according to known techniques. Any client packet directed to the NAT machine 10 is processed in this manner.

In the conventional NAT system, however, a problem of traffic "bottleneck" exists at the NAT machine because all incoming packets from the client devices and all outgoing packets from the servers pass through the NAT machine. The traffic bottleneck problem limits severely the total capacity of the system. Furthermore, since the size of the outgoing packets from the servers is typically much larger than the size of the incoming packets from the client devices, the traffic bottleneck problem causes significant delays in the transmission of response packets to the client devices and data can be lost due to lengthy response times. Due to these problems with the conventional NAT systems, customers are often dissatisfied with the service offered by the website system and the website providers can lose valuable customers, forfeiting profit and jeopardizing professional reputation.

Therefore, a need exists for a technique which solves the traffic bottleneck problems of the conventional NAT systems, avoids communication delays and improves the performance of a website system. Furthermore, this technique should be implementable without requiring signification modification to the existing NAT systems to be cost effective.

SUMMARY OF THE INVENTION

The present invention is directed to an improved NAT method and system which overcomes the traffic bottleneck problems encountered in conventional NAT systems and methods. The improved NAT system configures multiple servers to perform outbound translations on response packets prepared by the servers, so that the response packets can be sent to the clients directly without having to pass through the NAT machine. This solves the traffic bottleneck problems at the NAT machine.

Particularly, the improved NAT system includes a single NAT machine and a plurality of identical servers, each server being provided with an outbound translation module capable of performing outbound translations on response packets prepared by the server. The NAT machine provides translation instructions to the outbound translation module of each server. The translation instructions carry client information (e.g., client IP address, client port number, etc.) so that the response packet can be sent to an appropriate client based on the client information. Using the translation instructions, the server translates the response packets and transmits the translated response packets directly to the client, thereby bypassing the NAT machine.

By configuring the servers, instead of the NAT machine, to perform outbound translations on the response packets, the traffic bottleneck problem and the capacity limitation imposed by the conventional NAT machines are eliminated and the overall operation and performance of the system is improved.

BRIEF DESCRIPTION OF THE DRAWINGS

FIG. 3 is a flowchart illustrating the processing steps of a NAT method according to one embodiment of the present invention.

FIG. 4 is a flowchart illustrating the processing steps of a NAT method according to another embodiment of the present invention.

DETAILED DESCRIPTION OF THE PREFERRED EMBODIMENTS

Figure 1:
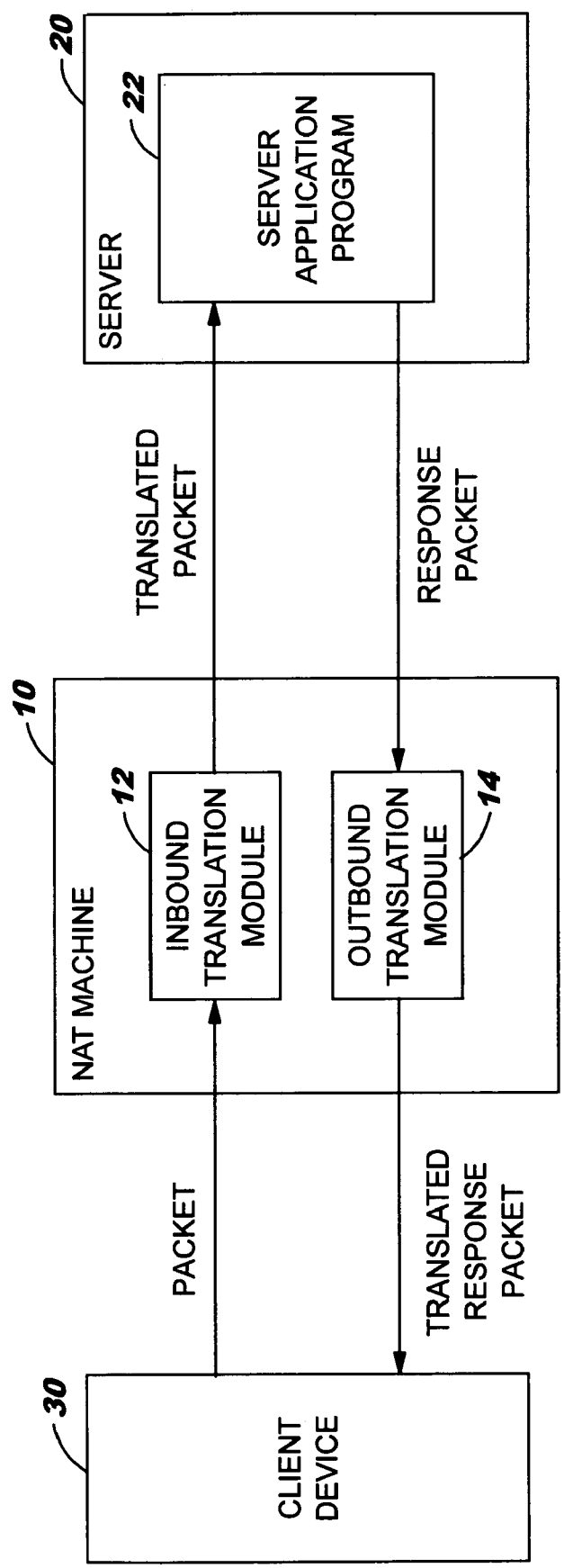
FIG. 1 is a block diagram of a conventional NAT system.

In the drawings, the same reference numerals represent the same elements.

Figure 2:
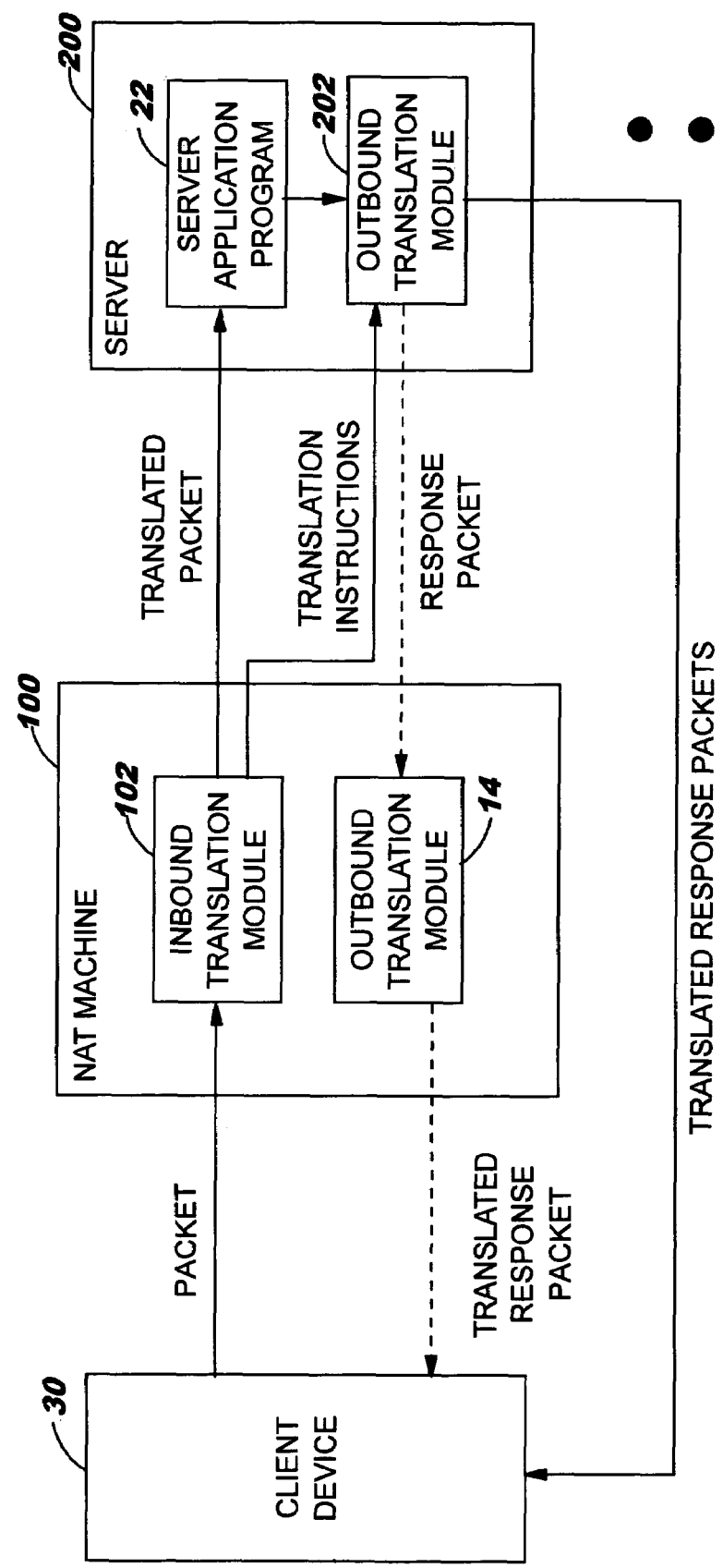
FIG. 2 is a block diagram of an improved NAT system according to a preferred embodiment of the present invention.

FIG. 2 is a block diagram of a NAT (Network Address Translation & Port Mapping) system according to a preferred embodiment of the present invention. As shown in FIG. 2, the NAT system includes a single NAT machine 100 and a plurality of identical servers 200 all coupled to the NAT machine 100. A plurality of client devices 30 communicate with the servers 200 through the NAT machine 100 via a network such as the Internet (not shown). The NAT machine 100 and the servers 200 are generally maintained by a single entity, e.g., a website provider. The NAT machine 100 includes an inbound translation module 102 for performing inbound translations on client packets and an outbound translation module 14 for performing outbound translations on response pockets (if the outbound translations are not performed by the server as indicated by the dotted lines). The inbound translation module 102 is a modified version of a conventional inbound translation module in that it is capable of providing translation instructions to the servers 200 in addition to performing conventional inbound translations.

Each of the servers 200 includes application program(s) 22 and an outbound translation module 202, operatively coupled. By providing the outbound translation module 202 in each server 200, the servers 200 are capable of performing outbound translations on response packets based on the translation instructions, which is a feature distinct from conventional NAT systems. The outbound translation module 202 of each server 200 includes conventional outbound translation hardware and/or software.

The translation instructions provided by the NAT machine 100 instruct each server 200 on how to modify the fields in the headers of the response packets prepared by the server 200 so that the response packets can be sent to appropriate clients. Particularly, the translation instructions carry information such as the local source port (NAT machine port) and IP source address (NAT machine IP address) used by the NAT machine 100 to transmit the client packet to the server 200 as well as the associated local source port (client port) and IP source address (client IP address) used by the client device 30 to transmit the packet to the NAT machine 100. Using the translation instructions, the server 200 can identify the client device (client IP address & port) to which the response packet should be sent and the response packet can be sent directly from the server 200 to the client device.

FIG. 3 is a flowchart illustrating the processing steps of a NAT method according to a simple embodiment of the present invention. These processing steps can be implemented in the NAT system shown in FIG. 2. As shown in FIG. 3, in Step S1, a server 200 in the NAT system prepares a response packet in response to a translated client packet received from the NAT machine 100 through a TCP/IP connection established between the NAT machine 100 and the server 200. In Step S2, the server 200 determines whether or not translation instructions are stored in the server 200. If the translations instructions are available in the server 200, then the server 200 performs in Step S3 an outbound translation on the response packet based on the translation instructions according to known techniques.

Then in Step S4, the response packet is sent directly from the server 200 to the client device 30, bypassing the NAT machine 100. All subsequent return traffic from the server 200 to the client device 30 bypasses the NAT machine 200 since the server 200 now performs the outbound translation.

If, on the other hand, it is determined at Step S2 that the translation instructions are not stored in the server 200, the server 200 in Step S5 sends the response packet to the NAT machine 100 which performs the outbound translation on the response packet and returns it to the client device 30, thereby completing the packet process in the NAT system.

Any packet from a client device directed to the NAT machine 100 is processed in this manner. One skilled in the art would readily understand that, once a TCP/IP connection is established among the client device 30, the NAT machine 100 and a particular server 200, the same translation instructions are used by the server 200 to translate all response packets prepared and communicated by that server 200 during that connection.

FIG. 4 is a flowchart illustrating the processing steps of a NAT method according to another embodiment of the present invention. These processing steps can be implemented in the NAT system shown in FIG. 2. As shown in FIG. 4, in Step S10, a client device 30 (e.g., a PC) transmits a packet to the NAT machine 100. If there is no established TCP/IP connection between the client device 30 and the system, this packet would be a SYN packet used in establishing a TCP/IP connection. The NAT machine in Step S12 receives the client packet, performs an inbound translation on the client packet by modifying the header of the client packet, and forwards the translated client packet to one of the servers 200 in the system. In Step S13, the NAT machine 100 selectively transmits to the server 200 the translation instructions for the current TCP/IP connection according to predetermined criteria. If the criteria are satisfied, the translation instructions are transmitted; otherwise, the translations are not transmitted to the server 200. In Step S14, the server 200 receives the translated client packet and prepares a response packet. If the client packet was a SYN packet, the response packet will be a SYN/ACK packet typically used in TCP/IP connections. In Step S16, the server 200 determines if the outbound translation instructions for the current connection are stored in the server 200. If the translation instructions are not available in the server 200 at Step S16, the server 200 in Step S16 transmits the response packet to the NAT machine 100. In Step S24, the NAT machine 100 receives the response packet and performs an outbound translation on the response packet by modifying the header of the response packet according to known techniques. Once Step S24 is completed, the NAT machine 100 transmits in Step S26 the translated response packet to the client device 30.

At Step S16, however, if the determination result indicates that the translation instructions are available in the server 200, the outbound translation module 202 of the server 200 in Step S28 performs an outbound translation on the response packet based on the translation instructions, which will be discussed below in more detail. Once the outbound translation is completed, the translated response packet is sent from the server 200 directly to the client device 30 in Step S30.

After Step S30 or S26, Step S32 is performed. In Step S32, the client device 30 receives the response packet either from the NAT machine (at Step S26) or from the server (at Step S30) and processes the response packet according to known techniques. Then the client device 30 in Step S34 determines if there are additional packets to be transmitted to the NAT machine 100. If there are no additional packets to be transmitted, then the process ends. However, if there are additional packets to be transmitted (i.e., further communication is desired via the current connection), the process returns to Step S10 and the next packet is transmitted to the NAT machine 100 in Step S10. The subsequent steps are performed as discussed herein above until all the packets are processed.

The outbound translation of a response packet based on the translation instructions, discussed in connection with Step S28 in FIG. 4 and Step 3 in FIG. 3, operates as follows. First, the header information of the response packet is examined to identify the current IP destination address and destination port. Since the client packet was sent from the NAT machine, the current IP destination address and destination port indicated in the header of the response packet will be the IP address and port of the NAT machine. Since the IP address and port of the NAT machine for the response packet is known, this information is used to find the client information from the translation instructions so that the response packet can be sent directly to the client. The translation instructions provide the client IP address and client port associated with the IP address and port of the NAT machine to the server. Thus, using this mapping information, the server obtains the client IP address and client port for sending the response packet, and sets the "IP Destination Address" and "TCP Destination Port" fields in the header of the response packet to equal the client IP address and client port, respectively. Now the header of the response packet identifies a particular client device that should receive the response packet, and the outbound translation is completed.

As discussed above at Step S13 in FIG. 4, the NAT machine 100 is configured to send translation instructions to the servers according to predetermined criteria so that the translation instructions are provided only at certain times. This feature may be valuable in some applications. For instance, in systems using HTTP 1.1 standards, the NAT machine may desire to receive response packets from the servers to determine if a successive request in the same connection should be sent to a different server. Similarly, in systems that use protocols containing important connection information beyond the initial connection request packet (e.g., a SYN packet), it can be important to delay sending the translation instructions to the server until the NAT machine receives additional response packets. In all these cases, the NAT machine 100 can be configured to send translation instructions after it receives a predetermined number of response packets, or a particular response packet through the current connection. In other embodiments, the NAT machine 100 can be configured to send translation instructions to the server automatically, if the translation instructions for the current TCP/IP connection have not been sent.

In another embodiment, the NAT machine 100 can be configured to send a request to the server 200 to stop performing outbound translations and to return the response packets directly to the NAT machine 100. This can be implemented by providing a request signal to the server 200 to delete the translation instructions stored in the server 200 or to disable the use of the translation instructions. In the latter case where the use of the translation instructions is disabled, the NAT machine 100 can transmit an enable signal to the server to re-enable the use of the stored translation instructions whenever that is desired.

In still another embodiment, each server 200 may send a signal to the NAT machine 100, which indicates that the server 200 will stop performing the outbound translations and will send the subsequent response packets directly to the NAT machine 100. This feature may be beneficial in cases where the server 200 is unable to perform the outbound translation, or where the server 200 has been instructed by the NAT machine 100 to stop the outbound translation. This ensures that all response packets are translated either by the server 200 or the NAT machine 100.

In accordance with the invention, the fields of the header of a packet, which may be modified by a translation operation, may include some or all of the following depending on the application: IP Source Address, IP Destination Address, TCP Source Port, TCP Destination Port, IP Checksum, and TCP Checksum. Other fields in the headers and/or data may be modified in the inbound and outbound translations depending on the application.

Furthermore, although the embodiments of the present invention have been described in context of TCP/IP connections, the present invention is equally applicable in systems employing other types of connections such as UDP connections.

Accordingly, by providing the outbound translation function of the NAT machine to each server in the system, the outbound traffic can flow directly from the servers to the clients. This improved traffic flow bypasses the NAT machine and eliminates the traffic bottleneck problems prevalent in conventional NAT systems. In addition, the processing load on the NAT machine can be greatly reduced, thereby eliminating communication delays and data loss.

The processing steps of the present invention can be implemented by computer programs. Software programming code which embodies the present invention can be stored in storage of some type, such as the storage associated with servers and/or a NAT machine. The software programming code may be embodied on any of a variety of known media such as a diskette, or hard drive, or CD-ROM, and may be distributed on such media. The techniques and methods for embodying software program code on physical media and/or distributing software code are known in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of processing a client packet sent from a client to a NAT system including a NAT machine and a plurality of servers, said NAT machine performing an inbound translation on said client packet and forwarding said translated client packet to one of the plurality of servers, the method comprising the steps of:
    preparing, by said one of the plurality of servers, a response packet responsive to the client packet;
    performing, by said one of the plurality of servers, a translation operation on the response packet to produce a translated response packet; and
    transmitting the translated response packet directly to the client from said one of the plurality of servers, thereby bypassing the NAT machine.

2. The method of claim 1, further comprising:
    determining whether translation instructions are stored in said one of the servers;
    executing the performing step if the determining step indicates that the translation instructions are stored in said one of the servers.

3. The method of claim 2, further comprising:
    sending the response packet from said one of the servers to the NAT machine if the determining step indicates that the translation instructions are not stored in said one of the servers.

4. The method of claim 2, further comprising:
    performing a translation operation on all subsequent response packets prepared by said one of the servers based on the translation instructions; and
    transmitting the translated subsequent response packets directly to the client.

5. The method of claim 2, further comprising:
    determining, by the NAT machine, if predetermined criteria have been satisfied for sending the translation instructions to said one of the servers; and
    sending the translation instructions to said one of the servers if the predetermined criteria have been satisfied.

6. The method of claim 2, wherein the translation instructions identify information to be modified in a header of the response packet.

7. The method of claim 2, wherein the performing step includes:

evaluating a header of the response packet to identify a current IP destination address and a current destination port indicated in the header, determining, using the translation instructions, a client IP address and a client port associated with the current IP destination address and the current destination port, and modifying the header of the response packet to designate the client IP address and client port as the current IP destination address and the current destination port, respectively.

8. The method of claim 1, further comprising:

transmitting, by the NAT machine, instructions to stop the translation operation; and transmitting, by said one of the servers, the response packet to the NAT machine according to said instructions.

9. A NAT (Network Address Translation and Port Mapping) system comprising:

a NAT machine for receiving a client packet from a client, performing an inbound translation on the client packet to produce a translated client packet, and sending said translated packet to one of a plurality of servers coupled to the NAT machine, said one of the servers receiving the translated client packet and preparing a response packet responsive to the translated client packet, said one of the servers including an outbound translation module for performing a translation operation on the response packet to produce a translated response packet and for transmitting the translated response packet directly to the client, thereby bypassing the NAT machine.

10. The system of claim 9, wherein said one of the servers determines whether translation instructions are stored in said one of the servers, performs the translation operation on the response packet if the translation instructions are stored in said one of the servers, and sends the response packet to the NAT machine if the translation instructions are not stored in said one of the servers.

11. The system of claim 10, wherein said one of the servers performs translation operations on all subsequent response packets prepared by said one of the servers based on the translation instructions, and transmits the translated subsequent response packets directly to the client.

12. The system of claim 10, wherein the translation instructions identify information to be modified in a header of the response packet.

13. The system of claim 10, wherein said one of the servers evaluates a header of the response packet to identify a current IP (Internet Protocol) destination address and a current destination port indicated in the header, determines, using the translation instructions, a client IP address and a client port associated with the current IP destination address and the current destination port, and modifies the header of the response packet to designate the client IP address and client port as the current IP destination address and the current destination port, respectively.

14. The system of claim 9, wherein the NAT machine transmits to said one of the servers instructions not to perform the translation operation on the response packet, and said one of the servers transmits the response packet to the NAT machine according to the instructions.

15. A computer program product embodied on computer readable media readable by a computing device, for processing a client packet sent from a client to a NAT (Network Address Translation & Port Mapping) system including a NAT machine and a plurality of servers, said NAT machine performing an inbound translation on said client packet and forwarding said translated client packet to one of the plurality of servers, the product comprising computer executable instructions for:

preparing, by said one of the plurality of servers, a response packet responsive to the client packet;

performing, by said one of the plurality of servers, a translation operation on the response packet to produce a translated response packet; and transmitting the translated response packet directly to the client from said one of the plurality of servers, thereby bypassing the NAT machine.

16. The computer program product of claim 15, further comprising computer executable instructions for:

determining whether translation instructions are stored in said one of the servers;

executing the translation operation if the translation instructions are stored in said one of the servers; and sending the response packet to the NAT machine if the translation instructions are not stored in said one of the servers.

17. The computer program product of claim 16, further comprising computer executable instructions for:

performing translation operations on all subsequent response packets prepared by said one of the servers based on the translation instructions; and transmitting the translated subsequent response packets directly to the client.

18. The computer program product of claim 16, further comprising computer executable instructions for:

determining if predetermined criteria have been satisfied for sending the translation instructions to said one of the servers; and sending the translation instructions to said one of the servers if the predetermined criteria have been satisfied.

19. The computer program product of claim 16, wherein the translation instructions identify information to be modified in a header of the response packet.

20. The computer program product of claim 16, wherein the computer executable instructions for performing the translation operation include computer executable instructions for:

evaluating a header of the response packet to identify a current IP (Internet Protocol) destination address and a current destination port indicated in the header, determining, using the translation instructions, a client IP address and a client port associated with the current IP destination address and the current destination port, and modifying the header of the response packet to designate the client IP address and client port as the current IP destination address and the current destination port, respectively.

21. The computer product of claim 15, further comprising computer executable instructions for:

transmitting, by the NAT machine, instructions to stop the translation operation; and transmitting, by said one of the servers, the response packet to the NAT machine according to said instructions.

* * * * *